United States Patent
Weerackody

[19]

[11] Patent Number: 5,949,833
[45] Date of Patent: Sep. 7, 1999

[54] METHOD AND APPARATUS TO IMPLEMENT ANTENNA DIVERSITY FOR DIRECT SEQUENCE SPREAD SPECTRUM RECEIVERS

[75] Inventor: Vijitha Weerackody, Watchung, N.J.

[73] Assignee: Lucent Technologies Inc., Murray Hill, N.J.

[21] Appl. No.: 08/916,150

[22] Filed: Aug. 21, 1997

Related U.S. Application Data

[63] Continuation-in-part of application No. 08/555,959, Nov. 13, 1995.

[51] Int. Cl.$^6$ ........................ H04B 7/08
[52] U.S. Cl. .................. 375/347; 375/206; 455/137; 455/273; 455/276.1; 455/278.1; 455/304
[58] Field of Search .............................. 375/206, 347; 455/132, 137, 273, 276.1, 278.1, 304

[56] References Cited

U.S. PATENT DOCUMENTS

| | | | |
|---|---|---|---|
| 4,752,969 | 6/1988 | Rilling | 455/278 |
| 5,107,273 | 4/1992 | Roberts | 342/417 |
| 5,255,210 | 10/1993 | Gardner et al. | 364/574 |
| 5,289,499 | 2/1994 | Weerackody | 375/200 |
| 5,305,353 | 4/1994 | Weerackody | 375/347 |
| 5,481,570 | 1/1996 | Winters | 375/347 |

OTHER PUBLICATIONS

"A Fading Reduction Technique Using Interleave–Aided Open Loop Space Diversity for Digital Maritime–Satellite Communications," by H. Iwai et al, IEICE Transactions, vol. E 74, No. 10, Oct., 91, pp. 3286–3294.

*Primary Examiner*—Stephen Chin
*Assistant Examiner*—Amanda Le

[57] ABSTRACT

An invention for providing diversity for direct sequence spread spectrum wireless communication systems is presented. The invention provides a receiver technique in which M antennas are utilized at the receiver. Distinct weighting signals are applied to information signals received at each of the M antennas, with the weighing signals being, for example, distinct changes in either phase or amplitude. Applying weighing signals to each of the information signals received at the M receiver antennas results in constructive addition of derived signal vectors at predetermined intervals, which eliminates deep fading at the receiver. Each different time varying weighting signal is determined independently of the corresponding information signal and the combined received input signal.

24 Claims, 5 Drawing Sheets

METHOD AND APPARATUS TO IMPLEMENT ANTENNA DIVERSITY FOR DIRECT SEQUENCE SPREAD SPECTRUM RECEIVERS

RELATED APPLICATIONS

This application is a continuation-in-part of U.S. patent application Ser. No. 08/555,959 filed Nov. 13, 1995.

FIELD OF THE INVENTION

The instant invention is directed to Direct Sequence Spread Spectrum (DS-SS) wireless communication systems and, more particularly, to a DS-SS system in which multiple antennas are utilized to create time diversity at the DS-SS receiver.

BACKGROUND OF THE INVENTION

In cellular radio systems, each cell is a local geographic region containing a base station and a plurality of mobile users. Each mobile user communicates directly with a base station only; there is no direct mobile-to-mobile communication. The base station performs, among other things, a relay function allowing a mobile user to communicate with a user in another location. So, for example, the base station provides coupling of a mobile user's transmission to another mobile user in the same cell, to another base station for coupling to a mobile user in another cell, or to an ordinary public switched telephone network. In this way, a mobile user can send and receive information to and from any other addressable user. It is also to be understood that the term transmitter as used herein can mean either the base station or the user's mobile communication device. Similarly, the term receiver as used herein can mean either the base station or the user's mobile communication device.

Direct Sequence Spread Spectrum (DS-SS) systems, such as Direct Sequence Code Division Multiple Access (DS-CDMA) systems, are attracting widespread attention in the personal communication fields, such as, for example, digital cellular radio. In a DS-CDMA communication system, both the time and frequency domains may be shared by all users simultaneously (this simultaneous sharing of time and frequency domains is to be distinguished from time-division and frequency-division multiple access systems, TDMA and FDMA, where multiple user communication is facilitated with use of unique time slots or frequency bands, respectively for each user). As such, a base station may simultaneously transmit distinct information signals to separate users using a single band of frequencies. Individual information signals simultaneously transmitted may be isolated by each receiving user because of the base station's utilization of unique signature sequences in the transmission of the information signals. Prior to transmission, the base station multiplies each information signal by a signature sequence signal assigned to the user intended to receive the signal. To recover a transmitted signal from among those signals transmitted simultaneously in a frequency band, a receiving mobile user multiplies a received signal (containing all transmitted signals) by its own unique signature sequence signal and integrates the result. By so doing, the user identifies that signal intended for it, as distinct from other signals intended for other users.

In wireless communication systems (such as DS-CDMA systems), an information signal is communicated from a transmitter to a receiver via a channel comprising several independent paths. These paths are referred to as multipaths. Each multipath represents a distinct route an information signal may take in traveling between transmitter and receiver. An information signal communicated via such routes or multipaths, appears at a receiver as a plurality of multipath signals, one signal for each multipath.

The amplitudes and phases of signals received from a transmitter through different multipaths of a communication channel are generally independent of each other. Because of complex addition of multipath signals, the strength of received signals may vary between very small and moderately large values. The phenomenon of received signal strength variation due to complex addition of multipath signals is known as fading. In a fading environment, points of very low signal strength, or deep fades, are separated by approximately one-half wavelength from each other.

Multipaths encountered in wireless communication systems can be described by certain characteristics, such as amplitude attenuation and phase shifting. For example, the multipaths of a DS-CDMA channel may provide different amplitude attenuations and phase shifts to an information signal communicated from a transmitter to a receiver. These different amplitude and phase characteristics may vary due to, e,g., relative movement between transmitter and receiver, or changes in local geography of the transmitter or receiver due to movement. Because of the variation of multipath characteristics, a receiver can experience a signal which fades with time. This fading is a manifestation of the complex addition of multipath signals having time varying amplitudes and phases.

If the characteristics of a DS-CDMA multipath vary slowly, a receiver experiencing a deep fade may observe a weak signal for a long period of time. Long fades are not uncommon in, e.g., indoor radio systems, where relative movement between receivers and transmitters is slow or non-existent (often, one of these two is an immobile base station; the other is a mobile device carried by a person). Since the duration of a deep fade may be large in comparison to the duration of information symbols being communicated, long bursts of symbol errors may occur (due to the weakness of received signal strength for an extended period of time).

To avoid or mitigate the detrimental effects of fading, a technique providing diversity may be employed. Diversity refers generally to the ability of a communication system to receive information via several independently fading channels. As a general matter, diversity techniques enhance a system receiver's ability to combine or select (or both) signals arriving from these independently fading channels, thus enabling (or facilitating) the extraction of communication channels.

U.S. Pat. No. 5,289,499 to Weerackody, the teachings of which are incorporated herein by reference as if fully set forth herein, describes a diversity scheme for a DS-SS system. The system described in this patent utilizes multiple transmit antennas in a digital data communication system to provide diversity by introducing a sequence of distinct weights to segments of a signal to be transmitted. In the illustrative embodiment provided, M copies of the signal are formed where M is the number of antennas used in transmitting the signal. This gives rise to time diversity at the DS-SS receiver. In contrast, the instant invention utilizes multiple antennas placed at the receiver to create time diversity at the receiver.

Also of interest is U.S. Pat. No. 5,305,353 to Weerackody, the teachings of which are incorporated herein by reference, as if fully set forth herein. This patent also teaches the use of multiple antennas at a transmitter, but does not consider the use of multiple antennas at a receiver for use in a DS-SS system.

An article entitled "A Fading Reduction Technique Using Interleave-Aided Open Loop Space Diversity For Digital Maritime-Satellite Communications," by H. Iwai, et al, IEICE Transactions, Vol. E 74, No. 10, October, 1991, pp. 3286–3294, discusses time varying phase weights at a receiver antenna. However, this reference does not discuss a DS-SS system of the type discussed in the instant application.

SUMMARY OF THE INVENTION

The present invention provides a technique for mitigating the detrimental effects of fading in DS-SS systems. An illustrative receiver embodiment of the invention provides diversity at the receiver by introducing a sequence of distinct weights to segments of each received signal.

More particularly, the receiver has M antennas, each of which receive information signals from a transmitter. A distinct phase shift is applied to each information signal received at each of the M antennas, with the phase shift varying over M distinct phase shifts between 0 and $2\pi$.

For example, with M equal to 2, the phase shift would switch between 0 and $\pi$. Advantageously, due to the phase shift applied to the received signals, signal vectors derived from each of the M receive antennas constructively add during predetermined intervals. The constructive addition of the signal vectors provide diversity at the receiver and eliminate the problem of deep fading in a DS-SS communication system.

DETAILED DESCRIPTION

Diversity using multiple receive antennas is very useful in direct-sequence code division multiple access (DS-CDMA) systems. However, since the carrier-to-noise ratio is very small in DS-CDMA systems, simple diversity techniques such as pre-detection selection diversity may not be very effective in such systems. The instant invention is directed to antenna diversity techniques that can be used in direct-sequence spread spectrum (DS-SS) systems. These techniques can be implemented at the RF/IF stages and do not require multiple analog-to-digital converters (ADC).

Figure 1:
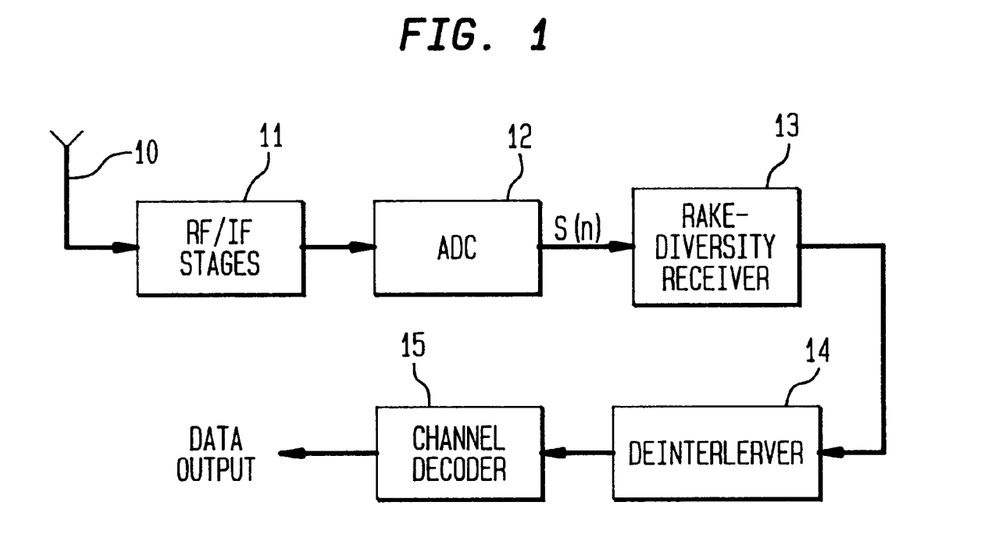
FIG. 1 illustrates the receiver structure for a Direct Sequence Spread Spectrum Communications System.

Referring now to FIG. 1, there is shown a receiver structure for a DS-SS system. As shown in FIG. 1, the received signal from a single antenna 10 is first fed into the RF/IF stages 11, and then sampled by an Analog to Digital Converter (ADC) 12. This signal is then processed digitally in the RAKE diversity receiver 13, the deinterleaver 14, and the channel decoder 15. The RAKE receiver is well known in the art. See, e.g., R. Price and P. E. Green, Jr., "A Communication Technique for Multipath Channels," 46 Proc. Inst. Rad. Eng. 555–70 (March, 1958). FIG. 5 in U.S. Pat. No. 5,289,499 also shows the details of a RAKE receiver. With reference to U.S. Pat. No. 5,289,499, note that the typical RAKE diversity combiner is obtained by setting M and m' to unity where M is the number of transmit antennas and m' indexes the segments of the data symbol.

The input to the RAKE receiver, s(n), is given by Eq. (1) in U.S. Pat. No. 5,289,499, where a(n) and b(n) are respectively, the user signature sequence, or the chip sequence, and the channel coded information data symbol sequence. These sequences are shown in FIG. 1 in U.S. Pat. No. 5,289,499. With reference to this FIG. 1 in U.S. Pat. No. 5,289,499, note that $T_c$ is the chip duration and T is the duration of an information data symbol. The function of the interleaver/deinterleaver and the channel decoder are discussed in U.S. Pat. No. 5,305,353.

In slow fading channels (typical indoor radio channels), because of the absence of time diversity, the gain obtained from the channel code system described in U.S. Pat. No. 5,289,499 is very small. This is discussed in detail in U.S. Pat. No. 5,305,353.

In the '353 patent, multiple transmit antennas are used in a digital data communication system to generate a fast fading effect at the receiver. In this invention, we consider a DS-SS system and employ multiple antennas placed at the receiver to obtain time diversity at the DS-SS receiver.

Figure 2:
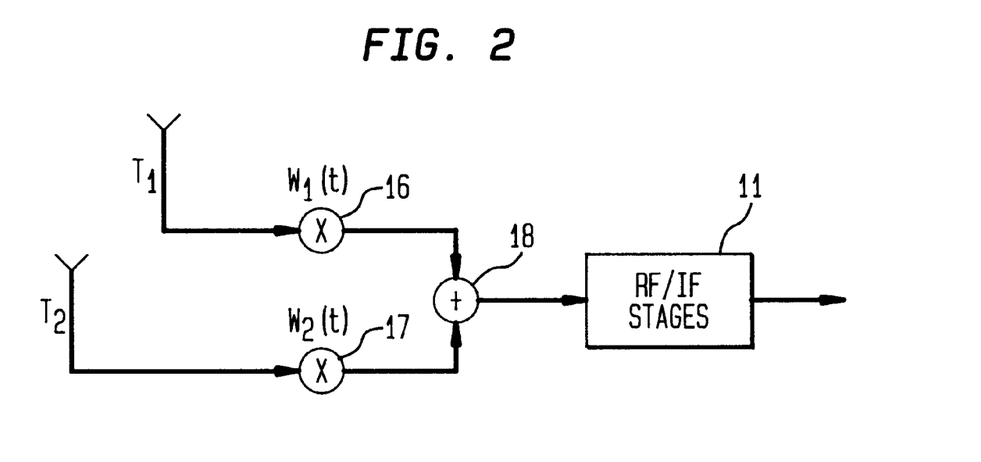
FIG. 2 illustrates time varying phase and/or amplitude weighting at a multiple antenna receiver.

Referring now to FIG. 2, consider the antenna $T_1$ and $T_2$ placed at the receiver. The received signals from these antennas are first weighed by $w_1(t)$ at 16, and $w_2(t)$ at 17, summed at 18 and then fed to the RF/IF stages 11. Note that these weights may be applied digitally after the ADC 12. However, it is cost effective to employ the weights at the RF/IF stages as shown in FIG. 2 because of the high sampling rate requirements on the ADC. These weights are time varying and can be either phase or amplitude variations, or a combination of these two.

FIGS. 1A and 1B of U.S. Pat. No. 5,305,353, demonstrate the effect of time varying phase variations applied at transmit antennas $T_1$ and $T_2$. In this case, $S_1$ and $S_2$ are the signal vectors received from antennas $T_1$ and $T_2$ respectively. FIG. 1A in U.S. Pat. No. 5,305,353, shows a deep fade because the two signal vectors add in a destructive manner. The duration of these deep fades will be very large if the weight vectors $w_1(t)$ and $w_2(t)$ are not time varying. However, when time variations are introduced to the weights, the signal vectors $S_1$ and $S_2$ rotate continuously and the deep fades shown in this figure will quickly disappear. FIG. 1B in the '353 patent depicts an instant when $S_1$ and $S_2$ add in a constructive manner. That is, the '353 patent disclosure describes a time varying signal whose strength varies from a very small value to a large value due to the use of multiple transmit antennas. In this manner, time diversity is introduced at the receiver. This invention strives to introduce the same time diversity, but through the use of multiple antennas and multiple weighting factors applied at the receiver, as opposed to the use of multiple antennas and weighting factors applied at the transmitter.

Figure 3A:
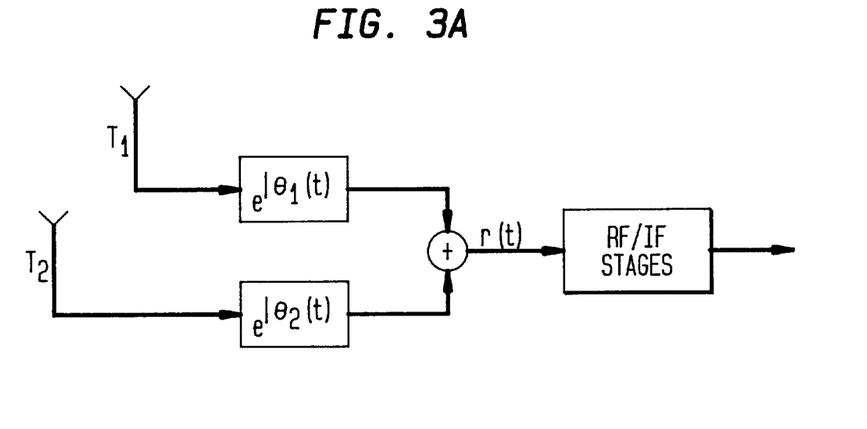
FIGS. 3A and 3B illustrate the use of time varying phase offsets at a multiple antenna receiver.
Figure 3B:
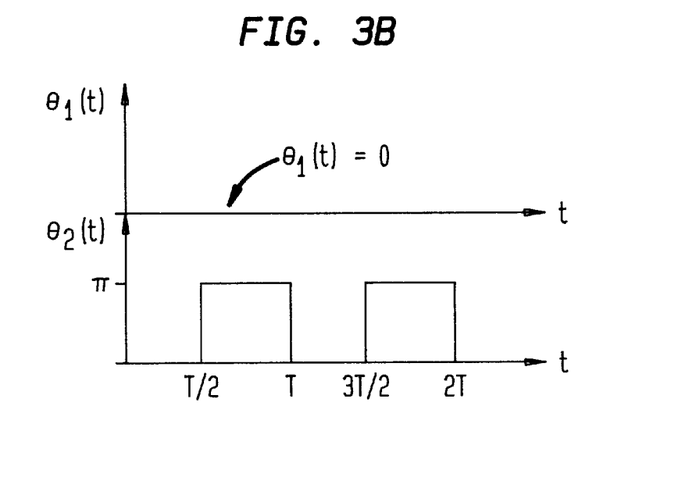

Consider the case of two receive antennas, $T_1$ and $T_2$ shown in FIG. 3A. The functions $\theta_1(t)$ and $\theta_2(t)$ introduce time varying phase offsets such that:

$$\theta_1(t) = 0 \text{ for all } t$$

$$\theta_2(t) = \begin{cases} 0 & iT < t < \left(i+\frac{1}{2}\right)T \\ \pi & \left(i+\frac{1}{2}\right)T < t < (i+1)T \end{cases}$$

where i=0,1,2 . . . These phase variations are shown in FIG. 3B. Note that in this case the phase variations occur within a duration of an information data symbol, which is T.

Figure 4:
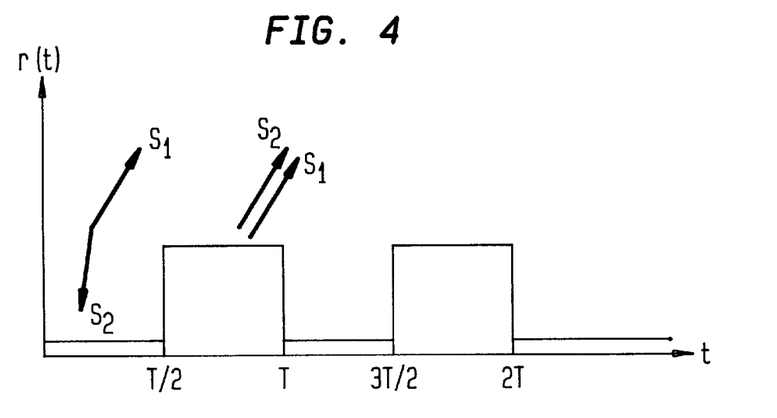
FIG. 4 illustrates the diversity effect obtained by the use of time varying phase offsets at a multiple antenna receiver.

The diversity effect obtained from this technique can be described as follows. Suppose $S_1$ and $S_2$ are respectively the receive signal vectors from antennas $T_1$ and $T_2$. Suppose these signal vectors are such that they cancel each other in the time interval iT<t<(i+½)T. This is shown in FIG. 4 in the interval of duration T/2. However, as shown in FIG. 4, these two signals add constructively in the interval (i+½) T<t<(i+ 1) T, because $\theta_2(t)$ changes its phase to $\pi$.

The output signal in a DS-SS receiver is obtained by multiplying the received signal by the corresponding chip sequence and integrating the result over a period of T. That is, the output signal strength from the receiver depends on the input signal strength over a period of T. As is seen from FIG. 4, the input signal strength (output from the antenna combination) alternates between weak and strong over an interval of T. In this case, the signal strengths in two of the intervals, (i–½) T<t<iT and iT<t<(i+½) T, will be independent of each other. Thus, the technique advantageously gives rise to diversity of order two at the receiver.

The receiver structure for this technique can be derived as follows. Note that FIG. 5 in U.S. Pat. No. 5,289,499 (with m'=1 and M=1) gives the conventional RAKE diversity receiver.

Figure 5:
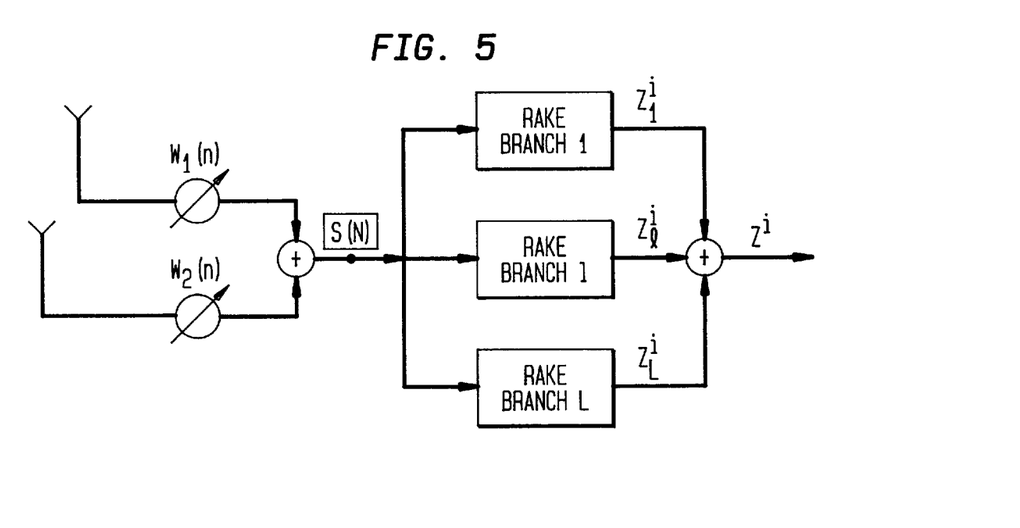
FIG. 5A and 5B illustrates the receiver structure for the case of two antennas subjected to a time varying weight function for a Direct Sequence Spread Spectrum Communications System.
Figure 6A:
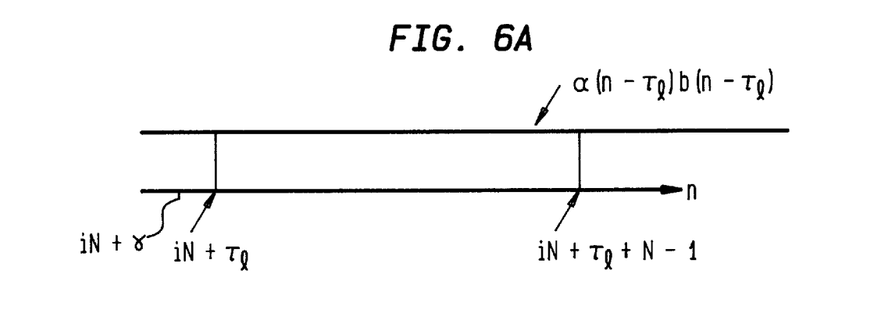
FIGS. 6A and 6B illustrate a formulation for the signal and signal strength at the output of the combiner for the two antenna receiver structure of FIG. 4.
Figure 6B:
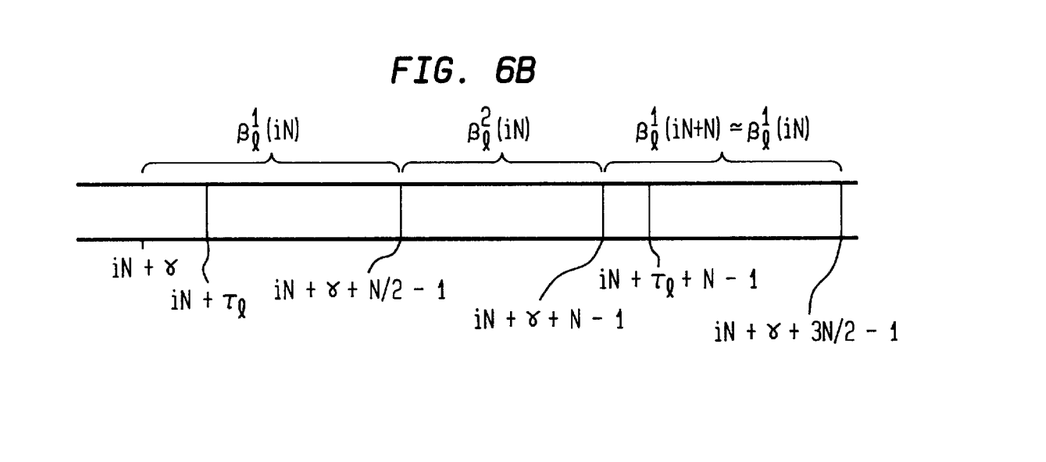

FIG. 5, illustrates the case of receiver diversity obtained with the provision of two receive antennas, M=2, and a RAKE receiver modified in accordance with the principles of the invention. As shown in FIG. 5, $w_1(n)$ and $w_2(n)$ are complex weights such that $w_1(n)$ and $w_2(n)$ are constant for the intervals:

$iN+\gamma \leq n \leq iN+\gamma+N/2-1$ $iN+\gamma+N/2 \leq n \leq iN+\gamma+N-1$ where "n" is the time index, s(n) is the signal at the output of the combiner element, and "$\gamma$" is a constant offset defined as the distance (in chips) from $\tau_1$, where $\tau_1$ is the arrival time (transmission delay) of the $1^{th}$ multipath at the receiver. It is assumed that $\gamma<\tau_1<\tau_2<\tau_3<\ldots<\tau_L$. Considering the notation of Eq. (1) of U.S. Pat. No. 5,289,499, it is shown that the desired input signal for the $1^{th}$ branch of the RAKE receiver is $\beta_l a (n-\tau_l) b (n-\tau_l)$. FIG. 6(a) illustrates the receive data symbol sequence (as a function of time index n) before weighting is applied. FIG. 6(b) illustrates the output s(n) of the combiner element with $\beta_1$ and $\beta_2$ illustrating the composite fade coefficients of s(n). As shown in FIG. 6(b), for practical fading channels, it may be assumed that:

$\beta_l^1(iN+N)=\beta_l^1(iN)$

Note that digital notation is used in describing the receiver structure. With this notation, the receiver output for the $1^{th}$ branch of the RAKE receiver in the implementation illustrated in FIG. 4 can be written as:

$$z_l^i = \sum_{n=iN+\tau_l}^{iN+Y+N/2-1} s(n)a(n-\tau_l)\beta_l^{1*}(iN) +$$

$$\sum_{n=iN+Y+N/2}^{iN+Y+N-1} s(n)a(n-\tau_l)\beta_l^{2*}(iN) +$$

$$\sum_{n=iN+Y+N}^{iN+\tau_l+N-1} s(n)a(n-\tau_l)\beta_l^{1*}(iN)$$

The output of the RAKE receiver for this case is given by $\Sigma_{l=1}^{L} Z_l^i$ where L is the number of RAKE branches.

Figure 7:
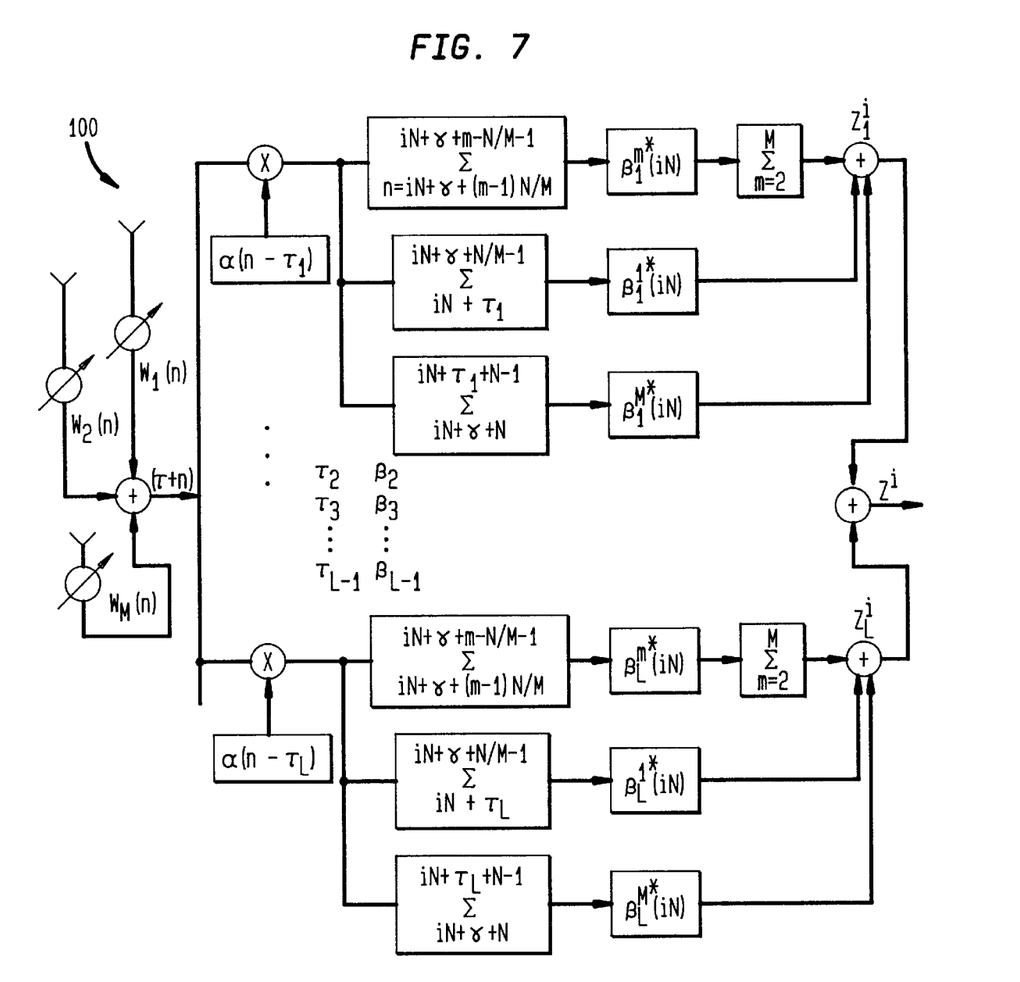
FIG. 7A and 7B illustrates the receiver structure for the case of multiple receive antennas subjected to a time varying weight function.

In the general case, the direct sequence spread spectrum receiver apparatus 100 for implementing antenna diversity includes M receive antennas and L RAKE branches, as is shown in FIG. 7. In the general case, each receive antenna is subject to a time varying weight function $w_m(n)$, m=1,2, . . . M that is applied at an arbitrary instant in time. Each weighting function is a complex weight that is fixed in the interval:

iN+$\gamma$+(m–1)N/M$\leq$n$\leq$iN+$\gamma$+mN/M–1, where m=1,2, . . . , M.

For ideal receiver response, the time axis may be divided into N/M equal length segments, however, in accordance with the principles of the invention, the M segments can be of unequal length without significantly detrimenting receiver response.

The receiver output for the $1^{th}$ branch of the RAKE receiver in the implementation illustrated in FIG. 7 can be written as:

$$z_l^i = \sum_{n=iN+\tau_l}^{iN+Y+N/M-1} s(n)a(n-\tau_l)\beta_l^{1*}(iN) +$$

$$\sum_{n=iN+Y+N/M}^{iN+Y+2N/M-1} s(n)a(n-\tau_l)\beta_l^{2*}(iN) +$$

$$\sum_{n=iN+Y+N}^{iN+\tau_l+N-1} s(n)a(n-\tau_l)\beta_l^{1*}(iN)$$

Figure 8A:
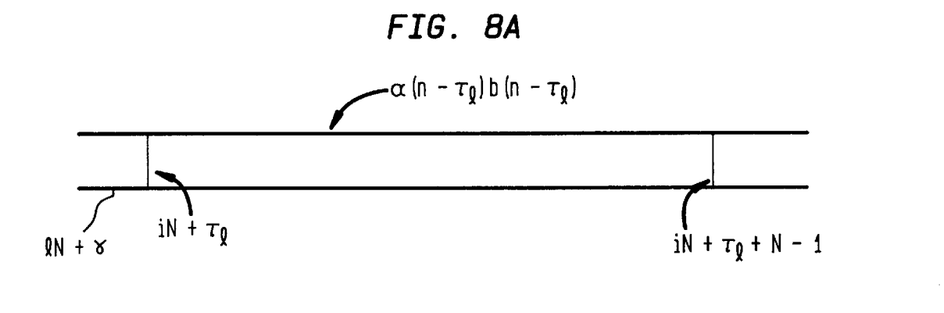
FIGS. 8A and 8B illustrate the signal and signal strength for the general case of multiple receive antennas.
Figure 8B:
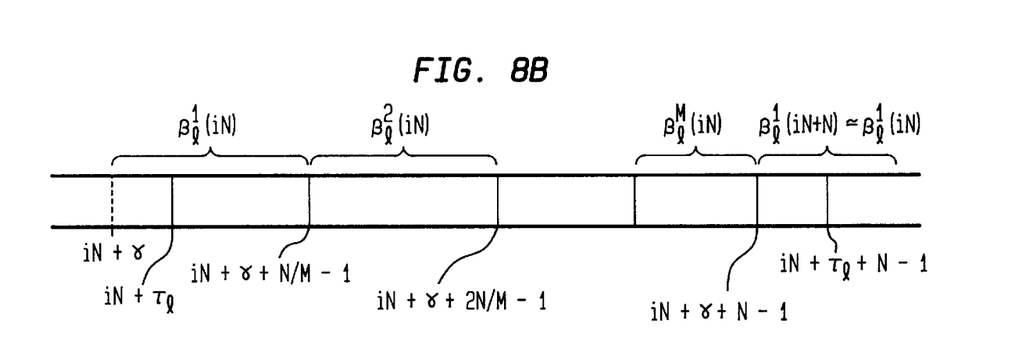

FIGS. 8A and 8B show the values $\beta_l$ takes in the general case. In these figures, it is assumed that:

$\beta_l^1(iN+N)=\beta_l^1(iN)$

In the presence of M receive antennas, according to this invention, each branch of the RAKE receiver should be changed as discussed above. In this case, each branch of the RAKE receiver gives rise to diversity obtained from the M antennas. Thus, the addition of the L RAKE branches gives the composite diversity benefit due to M receive antennas and L RAKE branches.

The foregoing disclosure and description of the invention is illustrative and explanatory thereof, and various changes may be made within the scope of the appended claims without departing from the spirit of the invention.

What is claimed is:

1. A method of operating a direct-sequence spread spectrum communication system for transmitting an information signal from a transmitter to a receiver, said receiver including a plurality of M antennas, said information signal being received at each of said M antennas, the method comprising the steps of:

weighting each information signal received at each of said M antennas with a different time varying weighting signal, and combining each differently weighted information signal to generate a combined received signal, wherein each said different time varying weighting signal is determined independently of said corresponding information signal and said combined received input signal.

2. A method in accordance with claim 1, wherein the step of weighting each information signal comprises applying a distinct phase shift to each information signal received at each of said M antennas, said distinct phase shift being applied at an arbitrary insant in time.

3. A method in accordance with claim 2, wherein said information signal is comprised of a plurality of information data symbols, said distinct phase shift occurring within a duration of said information data symbols.

4. A method in accordance with claim 3, wherein said distinct phase shift comprises phase shift $\theta_1(t)$, and phase shift $\theta_2(t)$, with $\theta_1(t)$ being equal to 0 for all time (t), and $\theta_2(t)$ being equal to 0 for the duration of $iT<t<(i+½)T$ and equal to $\pi$ for the duration $(i+½)T<t<(i+1)$ T, where T is the duration of an information data symbol and i is an integer.

5. A method in accordance with claim 4, wherein the method further comprising the step of adjusting said distinct phase shift such that signal vectors S1 and S2 received at antennas T1 and T2 constructively add to each other during predetermined intervals.

6. A method of operating a direct-sequence spread spectrum communication system for transmitting an information signal from a transmitter to a receiver, said receiver including a plurality of M antennas, said information signal being received at each of said M antennas, the method comprising the steps of:

weighting each information signal received at each of said M antennas with a different time varying weighting signal, each said different time varying weighting signal is determined independently of said corresponding information signal; and adjusting said weighting step such that signal vectors derived from said received information signal constructively add to each other during predetermined intervals.

7. A method in accordance with claim 6, wherein the step of weighting each information signal comprises applying a distinct phase shift to each information signal received at each of said M antennas.

8. A method in accordance with claim 7, wherein said distinct phase shift varies over M distinct phase shifts between 0 and $2\pi$.

9. A method in accordance with claim 6, wherein the step of weighting each information signal comprises applying a distinct amplitude change to each information signal received at each of said M antennas.

10. A method in accordance with claim 6, which further includes the steps of combining each differently weighted information signal to generate a combined received signal.

11. A method in accordance with claim 6, wherein said weighing step includes the step of setting a rate of said time varying weighing signal as a percentage of a channel coded symbol rate.

12. A method in accordance with claim 11, wherein said percentage is in the range of 1–2% of said channel coded symbol rate.

13. A direct-sequence spread spectrum communication system for transmitting an information signal from a transmitter to a receiver, said receiver including a plurality of M antennas, said information signal being received at each of said M antennas, said communication system comprising:

means for weighting each information signal received at each of said M antennas with a different time varying weighting signal, and means for combining each differently weighted information signal to generate a combined received signal, wherein each said different time varying weighting signal is determined independently of said corresponding information signal and said combined received input signal.

14. A communication system in accordance with claim 13, wherein said weighting means includes means for applying a distinct phase shift to each information signal received at each of said M antennas.

15. A communication system in accordance with claim 14, wherein said distinct phase shift comprises phase shift $\theta_1(t)$, and phase shift $\theta_2(t)$, with $\theta_1(t)$ being equal to 0 for all time (t), and $\theta_2(t)$ being equal to 0 for the duration of $iT<t<(i+½)T$ and equal to $\pi$ for the duration $(i+½)T<t<(i+1)T$, where T is the duration of an information data symbol and i is an integer.

16. A direct-sequence spread spectrum communication system for transmitting an information signal from a transmitter to a receiver, said receiver including a plurality of M antennas, said information signal being received at each of said M antennas, said communication system comprising:

means for weighting each information signal received at each of said M antennas with a different time varying weighting signal, and means for adjusting said weighting step such that signal vectors derived from said received information signal constructively add to each other during predetermined intervals.

17. A communication system in accordance with claim 16 wherein said weighting means includes means for applying a distinct phase shift to each information signal received at each of said M antennas.

18. A communication system in accordance with claim 17, wherein said distinct phase shift varies over M distinct phase shifts between 0 and $2\pi$.

19. A communication system in accordance with claim 18, wherein said weighting means includes means for applying a distinct amplitude change to each information signal received at each of said M antennas.

20. A receiver for use in a direct-sequence spread spectrum communication system where an information signal is transmitted from a transmitter to said receiver, said receiver including a plurality of antennas, said information signal being received at each of said plurality of antennas, said receiver comprising, means for weighting each information signal received at each of said plurality of antennas with a different time varying weighting signal, and means for combining each differently weighted information signal to generate a combined received signal, wherein each said different time varying weighting signal is determined independently of said corresponding information signal and said combined received input signal.

21. A receiver for use in a direct-sequence spread spectrum communication system where an information signal is transmitted from a transmitter to said receiver, said receiver including a plurality of antennas, said information signal being received at each of said plurality of antennas, said receiver comprising, means for weighting each information signal received at each of said plurality of antennas with a different time varying weighting signal, each said different time varying weighting signal determined independently of said corresponding information signal; and means for adjusting said weighting step such that signal vectors derived from said received information signal constructively add to each other during predetermined intervals.

22. A receiver in accordance with claim 21 wherein said weighting means includes means for applying a distinct phase shift to each information signal received at each of said plurality of antennas.

23. A receiver in accordance with claim 22 wherein said distinct phase shift varies over a plurality of distinct phase shifts between 0 and $2\pi$.

24. A receiver in accordance with claim 23 wherein said weighting means includes means for applying a distinct amplitude change to each information signal received at each of said plurality of antennas.

* * * * *